(12) United States Patent
Ishida (10) Patent No.: US 7,901,013 B2
(45) Date of Patent: Mar. 8, 2011

(54) MOTORCYCLE WHEEL SPEED SENSOR MOUNTING STRUCTURE

(75) Inventor: Shinichiro Ishida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 654 days.

(21) Appl. No.: 11/932,218

(22) Filed: Oct. 31, 2007

(65) Prior Publication Data
US 2008/0110706 A1 May 15, 2008

(30) Foreign Application Priority Data

Nov. 13, 2006 (JP) ................. 2006-306175

(51) Int. Cl.
*B60T 8/66* (2006.01)
(52) U.S. Cl. ......... 303/168; 303/137; 324/166; 324/173; 73/493
(58) Field of Classification Search .......... 303/168, 303/137; 324/173, 166, 174; 73/493, 494, 73/491
See application file for complete search history.

(56) References Cited

U.S. PATENT DOCUMENTS

| 6,492,805 B1 * | 12/2002 | Wakabayashi et al. ........ 324/173 |
| 7,274,188 B2 * | 9/2007 | Ishida ........................... 324/173 |
| 7,661,771 B2 * | 2/2010 | Nimura et al. ................ 303/137 |
| 2005/0247499 A1 * | 11/2005 | Toyoda ........................ 180/219 |
| 2009/0183957 A1 * | 7/2009 | Ishida et al. ............. 188/181 R |

FOREIGN PATENT DOCUMENTS

| JP | 2001301675 | * 10/2001 |
| JP | 2005-271666 A | 10/2005 |

* cited by examiner

*Primary Examiner* — Robert A Siconolfi
*Assistant Examiner* — Mariano Sy
(74) *Attorney, Agent, or Firm* — Westerman, Hattori, Daniels & Adrian, LLP (57) ABSTRACT

A motorcycle wheel speed sensor mounting structure, includes an axle holder for supporting a front wheel is disposed below a front fork of the motorcycle and an axle support disposed in a lower part of the axle holder. Further, a caliper mount, for supporting a brake caliper of a disc brake, is disposed on a rear portion of the axle holder and a wheel speed sensor is mounted on the caliper mount, wherein the wheel speed sensor is located above a line connecting a lower end of the axle support to a lower end of the caliper mount.

2 Claims, 7 Drawing Sheets

MOTORCYCLE WHEEL SPEED SENSOR MOUNTING STRUCTURE

BACKGROUND OF THE INVENTION

The present invention relates to a motorcycle wheel speed sensor mounting structure in which a wheel speed sensor for detecting the rotation condition of a front wheel is provided below a front fork.

A motorcycle may have a wheel speed sensor for detecting the rotation condition of the front wheel (for example, rotation speed). This wheel speed sensor is mounted on an axle holder (on the vehicle body side) located below the front fork and placed a predetermined distance from a sensing hole of a pulsar ring to rotate together with the front wheel, in order to detect the number of sensing holes of the pulsar ring which pass through the wheel speed sensor area during running (See JP Application No. 2005-271666).

A detection signal from the wheel speed sensor is sent, for example, to the control unit of the ABS (antilock brake system) where the signal is used to prevent the front wheel from locking during braking. For this reason, the clearance between a sensing hole of the pulsar ring and the wheel speed sensor should be set to a predetermined distance to enable detection.

In the wheel speed sensor, located below the front fork, its distance or position may accidentally change from the preset one when it touches a bump in the road during running. In order to prevent the distance or position of the wheel speed sensor from changing from the preset one, it has been necessary to provide a cover which protects the wheel speed sensor by covering the outside of the wheel speed sensor.

The present invention has been made in view of the above circumstances and has an object to provide a motorcycle wheel speed sensor mounting structure which hardly causes the distance or position of the wheel speed sensor to change from the preset one, even without a cover covering the outside of the wheel speed sensor.

SUMMARY OF THE INVENTION

The present invention is characterized in that in a motorcycle wheel speed sensor mounting structure in which an axle holder for supporting a front wheel is provided below a front fork, an axle support is provided in a lower part of the axle holder, a caliper mount for mounting a brake caliper of a disc brake is provided in the rear of the axle holder, and a wheel speed sensor is mounted on the caliper mount, the wheel speed sensor being located above a line connecting the axle support's lower end and the caliper mount's lower end.

According to this structure, while the motorcycle is running or being pushed, a bump in the road would touch the axle support's lower end or the caliper mount's lower end before touching the lower part of the wheel speed sensor.

In this case, the motorcycle wheel speed sensor may be located inside a line connecting the axle support's outer end and the caliper mount's outer end.

According to this structure, while the motorcycle is running, a pebble or the like flying from the front wheel would touch the axle support's outer end or the caliper mount's outer end before touching the lateral side of the wheel speed sensor.

Furthermore, the caliper mount may have a surface for mounting the wheel speed sensor on its outer surface and a rib on its inner surface.

According to this structure, the wheel speed sensor mounted on the caliper mount does not interfere with the reinforcing rib.

According to the present invention, the motorcycle wheel speed sensor is located above a line connecting the axle support's lower end and the caliper mount's lower end, so that during running, a bump in the road would touch the axle support's lower end or the caliper mount's lower end before touching the lower part of the wheel speed sensor. Consequently, the wheel speed sensor rarely touches a bump in the road, so that even without a cover for covering the outside of the wheel speed sensor, the wheel speed sensor is kept in place. This eliminates the need for a protective member such as a cover.

Furthermore, the wheel speed sensor is located inside the line connecting the axle support's outer end and the caliper mount's outer end, so that during running, a pebble or the like flying from the front wheel would touch the axle support's outer end or the caliper mount's outer end before touching the lateral side of the wheel speed sensor.

Consequently, the wheel speed sensor rarely is hit by a pebble or the like flying from ahead of the vehicle body, so that even without a cover for covering the outside of the wheel speed sensor, the wheel speed sensor is kept in place, namely the wheel speed sensor is kept in place. This eliminates the need for a protective member such as a cover.

Furthermore, the caliper mount may have a surface for mounting the wheel speed sensor on its outer surface and a reinforcing rib on its inner surface, so that the wheel speed sensor mounted on the caliper mount does not interfere with the reinforcing rib. Consequently, the wheel speed sensor can be freely arranged, and the rib increases the strength of the caliper mount.

DETAILED DESCRIPTION OF THE INVENTION

Figure 1:
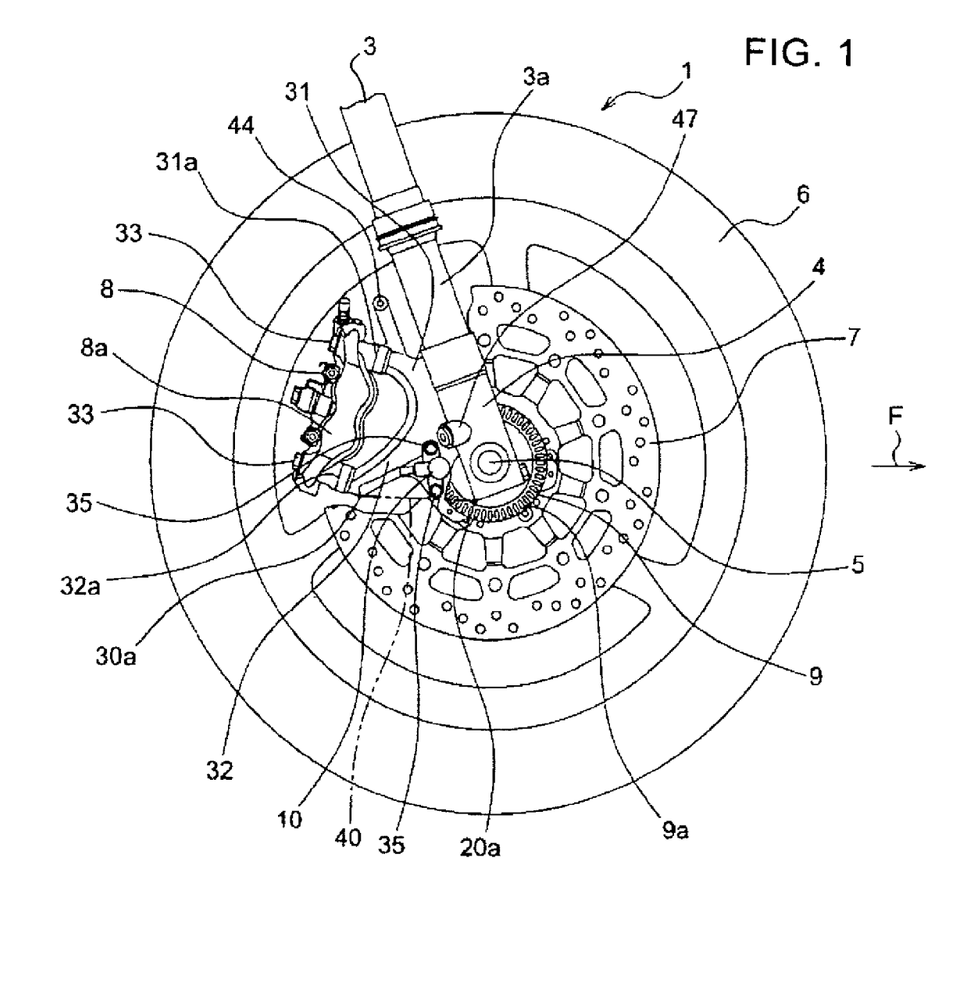
FIG. 1 is a side view of a front wheel having a motorcycle wheel speed sensor mounting structure according to an embodiment of the present invention.
Figure 2:
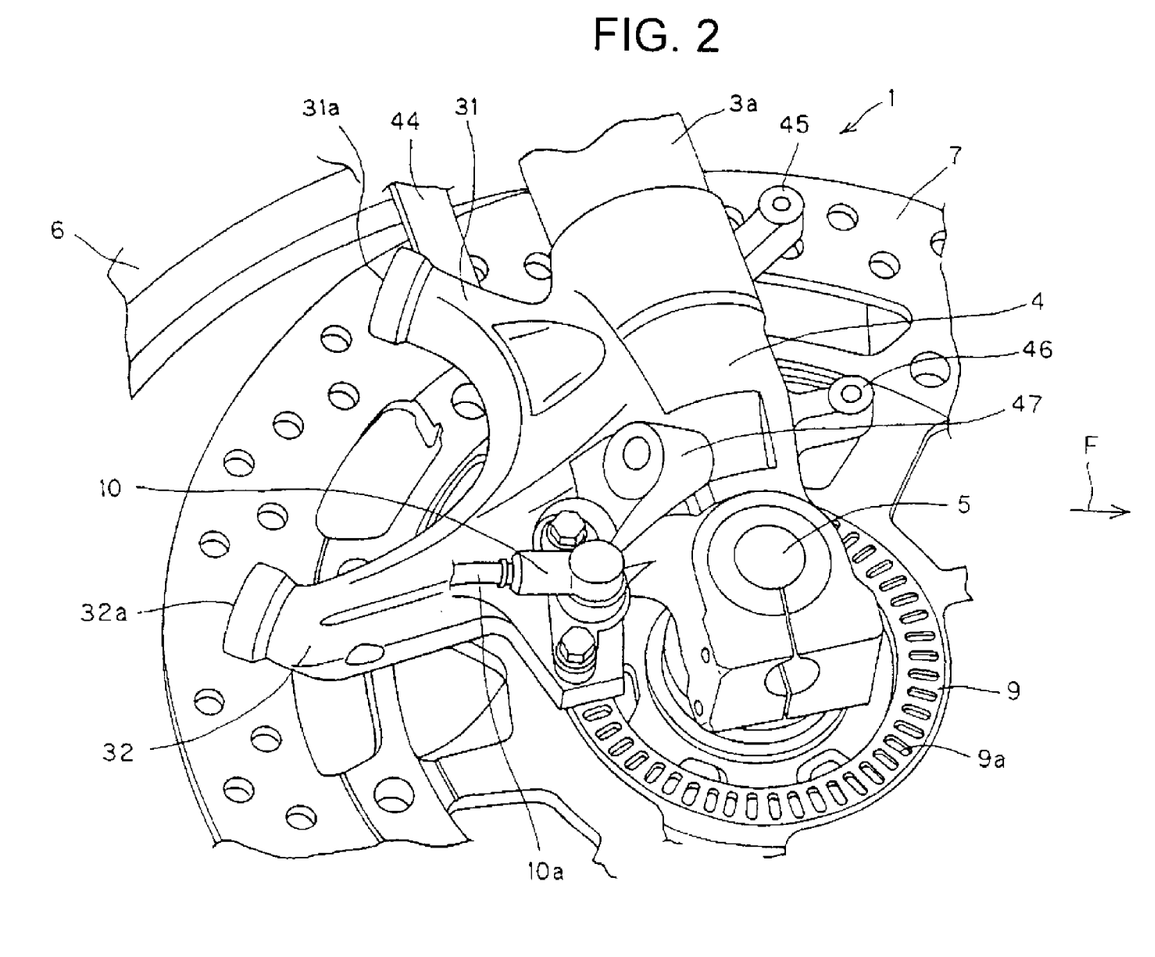
FIG. 2 is an enlarged view of an axle holder shown in FIG. 1 as seen obliquely from behind and below where a disc brake is omitted.

Next, a motorcycle wheel speed sensor according to an embodiment of the present invention will be described referring to drawings. FIG. 1 is an enlarged sectional view showing a motorcycle front wheel according to an embodiment of the invention, where the running direction of the motorcycle is indicated by arrow F. FIG. 2 is an enlarged view of an axle holder shown in FIG. 1 as seen obliquely from behind and below. For ease of explanation, the front fender covering the upper part of the front wheel is omitted in FIG. 1 and the disc brake is omitted in FIG. 2. In the explanation given below, the directions referred to are based on FIG. 1, in which the vehicle body's upward/downward (vertical) directions correspond to the upward/downward directions in FIG. 1, the vehicle body's left/right (transverse) directions correspond to the depth directions of the sheet of FIG. 1 and the vehicle body's front/rear (longitudinal) directions correspond to the left/right directions of the sheet of FIG. 1.

A pair of left and right telescopic front forks 3 extending forward and obliquely downward are provided on a front part of the motorcycle 1. These front forks 3 also function as steering transmission devices and suspension devices and below each of the front forks 3 is an axle holder 4 which rotatably journals an axle 5 extending in the depth direction of the sheet of FIG. 1. This enables a front wheel 6 fitted to the axle 5 to rotate together with the axle 5.

In the front wheel suspension structure shown in FIG. 1, the front fork 3 is of the inverted type. The inverted type front fork 3 includes an outer tube as an upper tube (not shown) and an inner tube 3a located below the outer tube, and the inner tube 3a is fitted to the axle holder 4. On the other hand, if the front fork 3 is of the normal type, it is also possible that an outer tube located below an inner tube is integral with an axle holder.

The axle holder 4 includes: a disc brake 8 which can sandwich and press a brake disc 7 provided on the front wheel 6 from both sides through a caliper 8a; and a wheel speed sensor 10 which detects sensing holes 9a of a pulsar ring 9 fitted to the front wheel 6 during running. As shown in FIGS. 1 and 2, the pulsar ring 9 has a substantially disc shape, and in the disc plane, there are a plurality of sensing holes 9a which are concentrically disposed and spaced with the axis of rotation as its center. During running, the wheel speed sensor 10 detects the number of sensing holes 9a passing through the sensor part of the wheel speed sensor 10 and sends a detection signal to a control unit (not shown) through a wire 10a.

Figure 3:
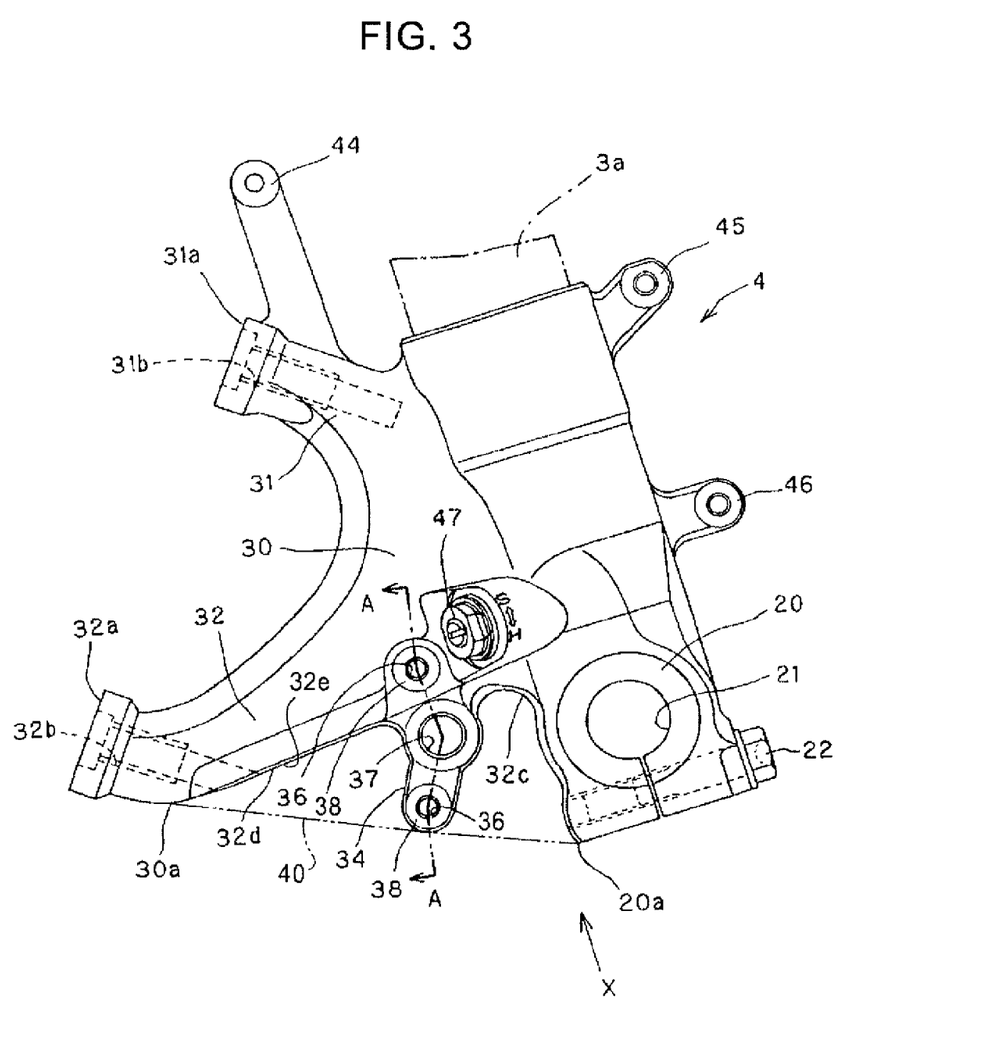
FIG. 3 is a side view singly showing the axle holder shown in FIG. 1.
Figure 4:
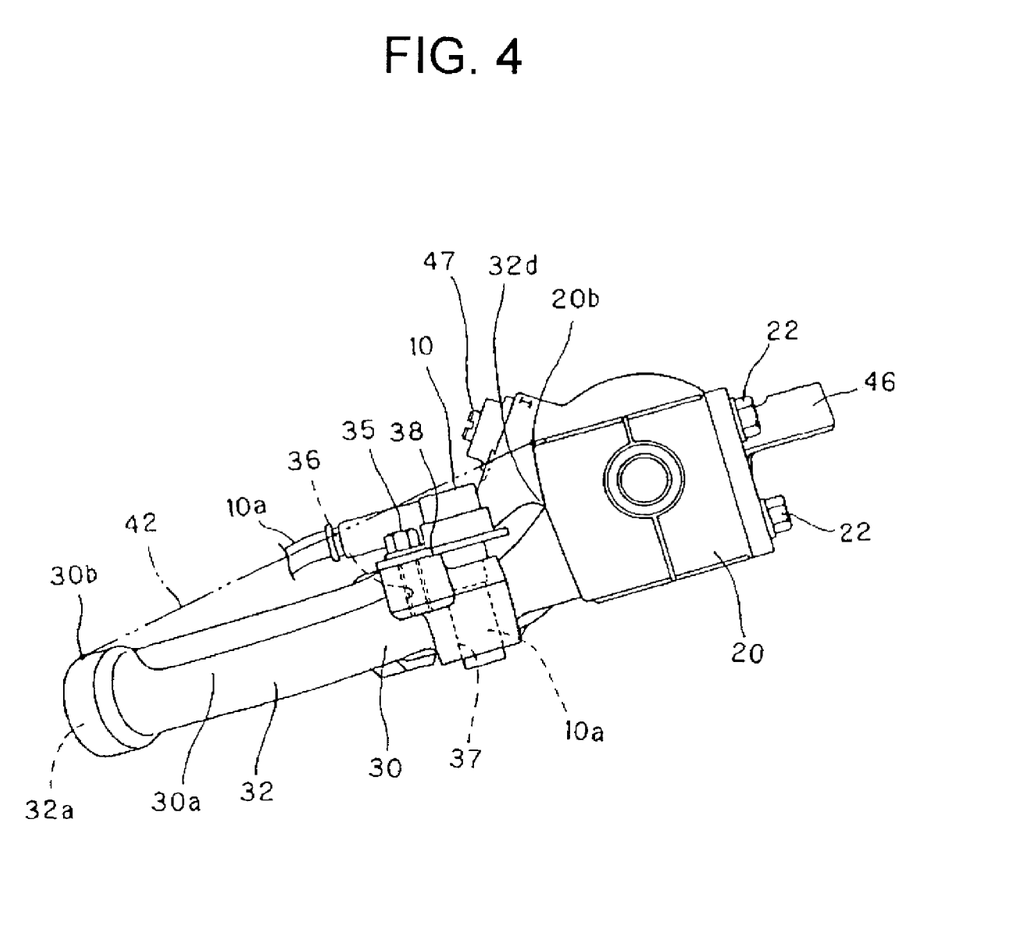
FIG. 4 is a view as seen from the direction of arrow X in FIG. 3.
Figure 5:
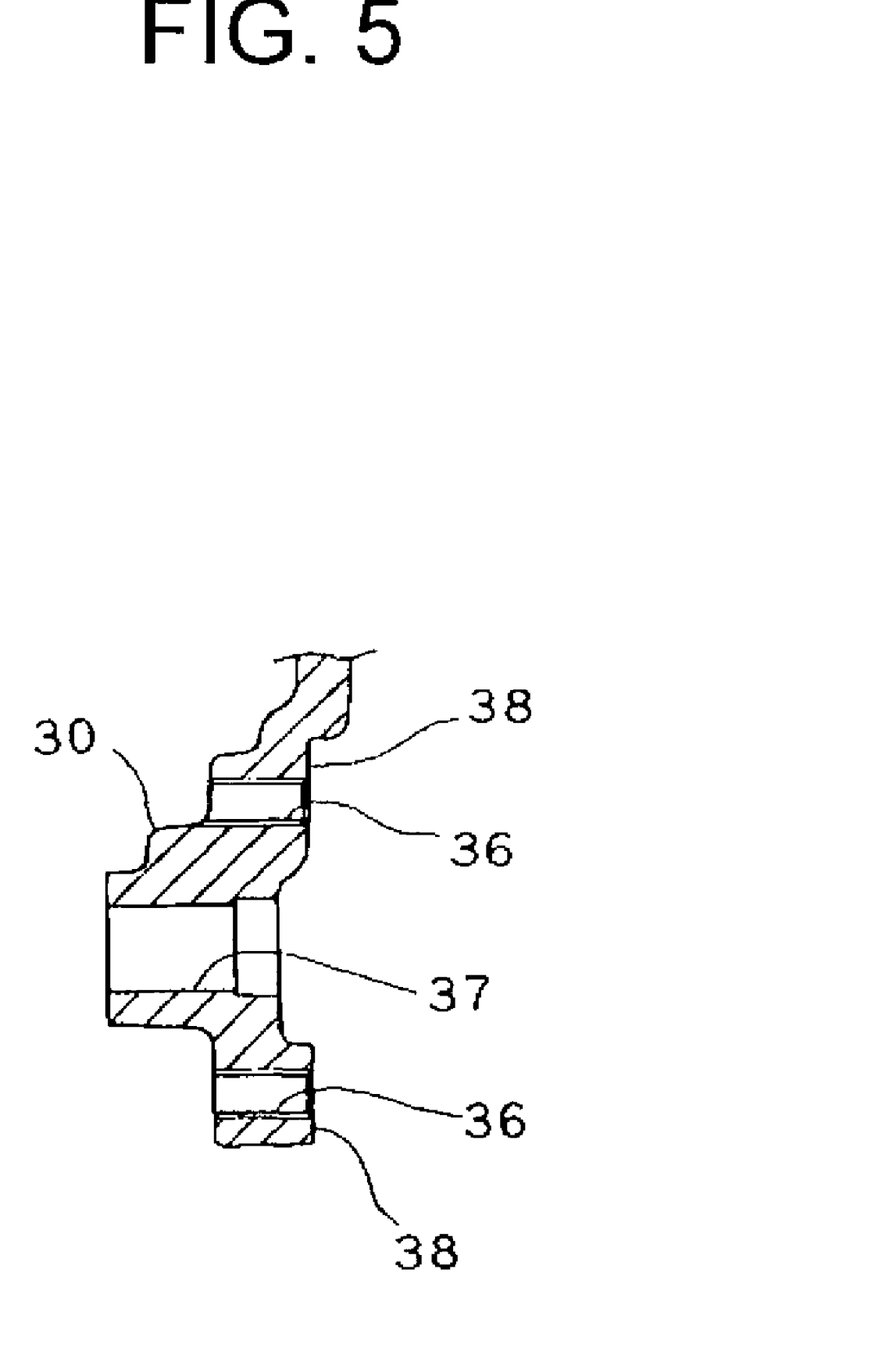
FIG. 5 is a sectional view taken along line A-A in FIG. 3.

FIG. 3 is a sectional view singly showing the axle holder 4 shown in FIG. 1 as seen from outside the vehicle body. FIG. 4 is a view as seen from the direction of arrow X in FIG. 3 where the axle holder 4's surface which is an upper side of the sheet of the figure is a surface oriented toward the outside of the vehicle body. FIG. 5 is a sectional view taken along the line A-A in FIG. 3 and the axle holder 4's surface which is on the right side of the sheet of the figure is a surface oriented toward the outside of the vehicle body. For convenience of illustration, FIG. 4 shows the wheel speed sensor 10 fitted to the axle holder 4.

As shown in FIG. 3, the axle holder 4 includes an axle support 20 located in a lower part of the axle holder 4, for supporting the axle 5, and a caliper mount 30 located in the rear of the axle holder 4, for fitting the disc brake 8.

The axle support 20 has a hole 21 for journaling the axle 5 and provided under the hole 21 are two adjusting bolts 22, 22 for adjusting the hole 21, as shown in FIGS. 3 and 4.

As shown in FIGS. 1 and 3, the caliper mount 30 is bifurcated into an upper arm portion 31 extending obliquely upward and rearward and a lower arm portion 32 extending obliquely downward and rearward from the point of attachment of the inner tube 3a.

Mounting surfaces 31a, 32a for mounting the disc brake 8 are formed at the tips of the upper arm portion 31 and the lower arm portion 32, respectively. The mounting surfaces 31a, 32a are parallel to each other and, as shown in FIGS. 1 and 3, are oriented toward the rear of the vehicle body obliquely upward when mounted on the vehicle body. Screw holes 31b, 32b are provided in the mounting surfaces 31a, 32a so that the disc brake 8 can be fitted with two mounting bolts 33, 33 inserted therein from behind the front wheel 6 substantially along a radial direction of the front wheel 6 as shown in FIG. 1.

As shown in FIG. 3, a mounting area 34 for mounting the wheel speed sensor 10 is formed on the lower arm portion 32. This wheel speed sensor mounting area 34 has two screw holes 36, 36 spaced vertically and a through-hole 37 for the sensor between the screw holes 36, 36. The two screw holes 36, 36 are formed in the direction from the front side to the depth side of the sheet of FIG. 3 and the sensor through-hole 37 is substantially parallel to the screw holes 36, 36. Of these screw holes 36, 36, the upper screw hole 36 is located above the lower arm portion 32's lower edge 32e (part facing the lower side of the vehicle body) and the lower screw hole 36 and the sensor through-hole 37 are located in a part protruding downward below the lower edge 32e.

As shown in FIG. 5, mounting surfaces 38, 38 for bolts 35, 35 to be fitted into the screw holes 36, 36 are substantially parallel to the plane of the pulsar ring 9 (see FIG.1) so that when the wheel speed sensor 10 is mounted, the wheel speed sensor 10 and the pulsar ring 9 are substantially parallel to each other. As shown in FIG. 4, a sensor part 10a of the wheel speed sensor 10 is inserted in the sensor through-hole 37, and the tip of the sensor part 10a slightly protrudes through the other opening of the sensor through-hole 37. As shown in FIGS. 1 and 2, the tip of the sensor part 10a is designed to face a plurality of sensing holes 9 of the rotating pulsar ring 9 with a predetermined clearance.

The lower edge 32e of the lower arm portion 32 is shaped as follows: as shown in FIG. 3, it has a base end 32c located obliquely upward to the left of the lower end 20a of the axle support 20 and extends obliquely downward to the left from the base end 32c to the lower end 30a of the caliper mount 30 and bends toward the mounting surface 32a located obliquely upward to the left. In other words, the lower part of the caliper mount 30 has a virtually triangular cutout shape (the base end 32c corresponds to the apex of the triangle) and the wheel speed sensor mounting area 34 is located inside the virtual triangle. More specifically, the lower end 20a of the axle support 20 and the lower end 30a of the caliper mount 30 are located so that as shown in FIG. 1, when the wheel speed sensor 10 is fitted to the axle holder 4, the wheel speed sensor 10 is above a line 40 (indicated by chain double-dashed line 40 in FIG. 1) connecting the lower end 20a of the axle support 20 and the lower end 30a of the caliper mount 30.

The outer edge (part facing the outside of the vehicle body) of the lower arm portion 32 is shaped as follows: as shown in FIG. 4, it has a base end 32d at a point along a line oriented toward the inside of the body (downward in the sheet of FIG. 4) from the outer end 20b of the axle support 20, and extends longitudinally from the base end 32d to the outer end 30b of the caliper mount 30. In other words, the caliper mount 30 is one step lower than the axle support 20, and the wheel speed sensor mounting area 34 is located on the base end 32d side of the caliper mount 30. More specifically, the outer end 20b of the axle support 20 and the outer end 30b of the caliper mount 30 are located so that as shown in FIG. 4, the wheel speed sensor 10, when fitted to the axle holder 4, is more on the inner side the vehicle body than a line 42 (indicated by chain double-dashed line in FIG. 4) connecting the outer end 20b of the axle support 20 and the outer end 30b of the caliper mount 30.

In FIG. 3, reference numerals 44, 45, 46 represent points where a front fender for covering the top of the front wheel is fitted; and reference numeral 47 represents an adjuster used to adjust the damping force of the front fork 3.

Figure 6:
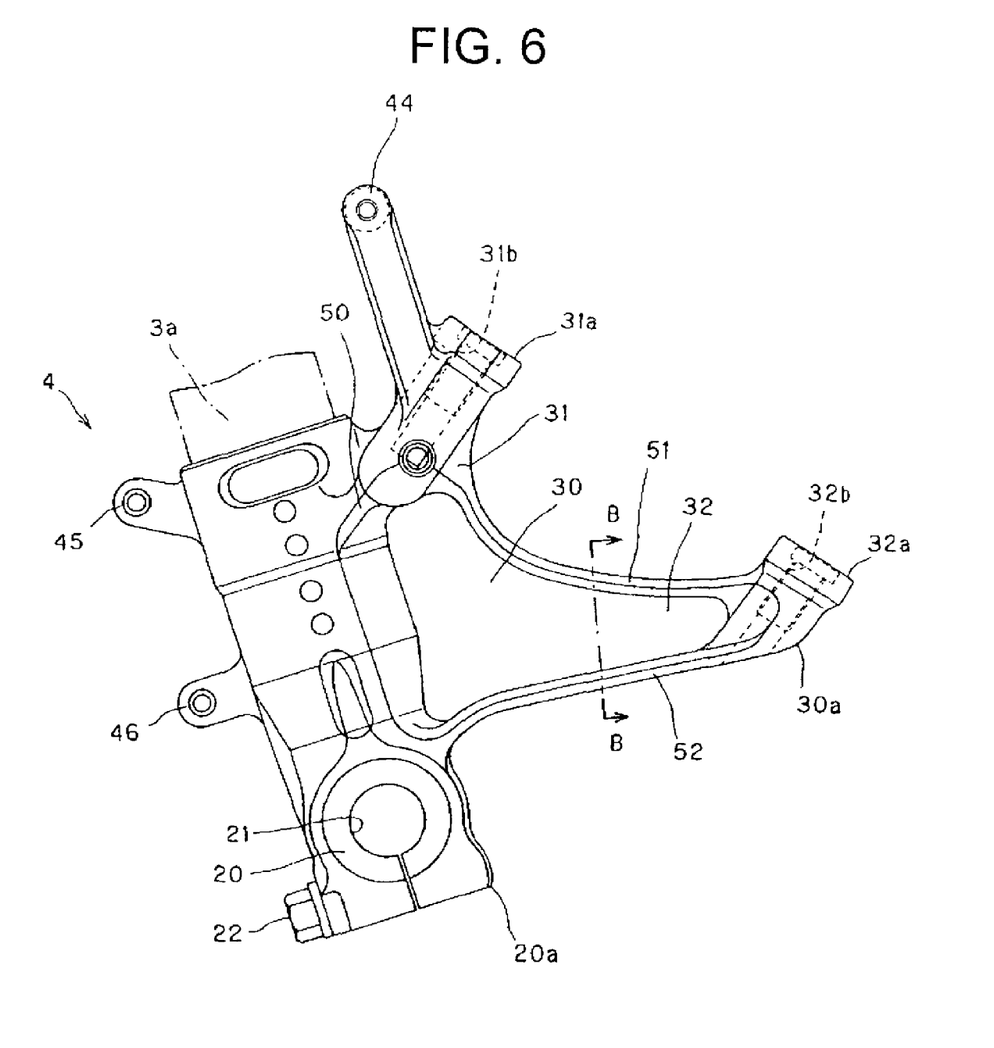
FIG. 6 is a back side back view of the axle holder shown in FIG. 3, seen from its back side.
Figure 7:
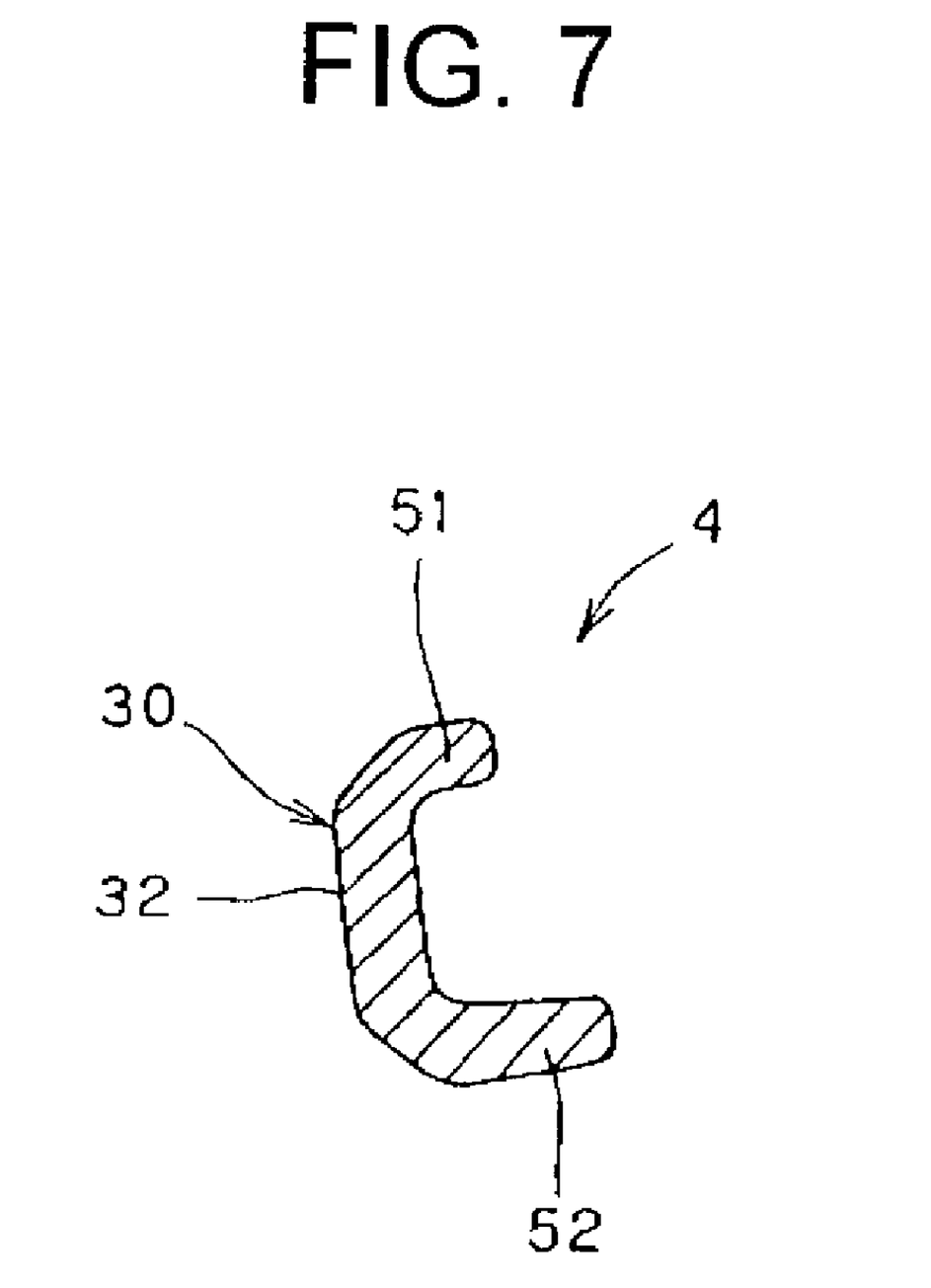
FIG. 7 is a sectional view taken along line B-B in FIG. 6.

FIG. 6 is a back side back view of the axle holder 4 shown in FIG. 3 seen from the back side. FIG. 7 is a sectional view taken along the line B-B in FIG. 6.

Reinforcing ribs 50, 51, 52 are formed along the edges of the upper arm portion 31 and the lower arm portion 32 on the back side (body inner side) of the axle holder 4. More specifically, the rib 50 lies between the upper part of the axle holder 4 and the upper arm portion 31, the rib 51 lies between the upper arm portion 31 and the lower arm portion 32, and the rib 52 lies between the lower arm portion 32 and the axle support 20, and as shown in FIG. 7, the ribs 50, 51, 52 protrude toward the inside of the body and in a direction opposite to the mounting surface 38 for the wheel speed sensor 10.

Regarding the protrusion length of the ribs, as shown in FIG. 7, the protrusion of the rib 52 is longer than that of the rib 51. The area surrounded by the ribs 50, 51, 52 is slightly indented and has substantially the same wall thickness as the ribs 50, 51, 52, contributing to weight reduction of the axle holder 4.

In the motorcycle wheel speed sensor mounting structure according to an embodiment of the present invention, the lower end 20a of the axle support 20 and the lower end 30a of the caliper mount 30 are located so that when the wheel speed sensor 10 is fitted to the axle holder 4, the wheel speed sensor 10 is above the line 40 connecting the lower end 20a of the axle support 20 and the lower end 30a of the caliper mount 30; therefore, during running, a bump in the road would touch the lower end 20a of the axle support 20 or the lower end 30a of the caliper mount 30 before touching the lower part of the wheel speed sensor 10. Consequently, the wheel speed sensor 10 hardly touches a bump in the road, so that even without a cover for covering the outside of the wheel speed sensor 10 (keeping the sensor in place), the wheel speed sensor 10 is kept in place. In other words, the wheel speed sensor 10 is kept in a predetermined positional relationship with a sensing hole 9a of the pulsar ring 9 with a predetermined clearance between them.

Furthermore, the outer end 20b of the axle support 20 and the outer end 30b of the caliper mount 30 are located so that when the wheel speed sensor 10 is fitted to the axle holder 4, the wheel speed sensor 10 is more on the inside of the vehicle body than the line 42 connecting the outer end 20b of the axle support 20 and the outer end 30b of the caliper mount 30; therefore during running, a pebble or the like flying from the front wheel 6 would touch the outer end 20b of the axle support 20 before touching the lateral side of the wheel speed sensor 10. Consequently, the wheel speed sensor 10 hardly touches a pebble or the like, so that even without a cover for covering the outside of the wheel speed sensor 10 (keeping it in place), the wheel speed sensor 10 is kept in place. In other words, the wheel speed sensor 10 is kept in a predetermined positional relationship with a sensing hole 9a of the pulsar ring 9 with a predetermined clearance between them.

Furthermore, reinforcing ribs 50, 51, 52 which protrude toward the inside of the body and in a direction opposite to the mounting surface 38 for the wheel speed sensor 10 are formed in the axle holder 4, so that the wheel speed sensor 10, as mounted on the caliper mount 30, does not interfere with the ribs 50, 51, 52. Consequently, the wheel speed sensor 10 can be freely arranged and the bending strength of the caliper mount 30 in the left/right and upward/downward directions of the vehicle body is higher than when the ribs 50, 51, 52 are not provided.

I claim:

1. A motorcycle wheel speed sensor mounting structure, comprising:
   an axle holder, for supporting a front wheel, disposed below a front fork of the motorcycle;
   an axle support disposed in a lower part of said axle holder;
   a caliper mount, for supporting a brake caliper of a disc brake, disposed on a rear portion of said axle holder; and
   a wheel speed sensor which detects a pulsar ring fitted to the front wheel during running,
   wherein said wheel speed sensor is located above a line connecting a lower end of said axle support to a lower end of said caliper mount and is located inside a line connecting an outer end of said axle support to an outer end of said caliper mount, and
   wherein said caliper mount has a surface for mounting said wheel speed sensor on an outer surface thereof, and has a rib on an inner surface thereof, opposing said outer surface.

2. A motorcycle wheel speed sensor mounting structure, comprising:
   an axle holder, for supporting a front wheel. disposed below a front fork of the motorcycle;
   an axle support disposed in a lower part of said axle holder;
   a caliper mount, for supporting a brake caliper of a disc brake, disposed on a rear portion of said axle holder; and
   a wheel speed sensor which detects a pulsar ring fitted to the front wheel during running,
   wherein said wheel speed sensor is located above a line connecting a lower end of said axle support to a lower end of said caliper mount,
   wherein said caliper mount has a lower arm portion extending obliquely downward and rearward,
   wherein a lower edge of the lower arm portion is shaped as a lower part of the caliper mount and has a substantially triangular cut-out shape, and
   wherein the wheel speed sensor is located inside the triangular cut-out shape.

\* \* \* \* \*